(12) United States Patent
Ahn et al.

(10) Patent No.: US 12,051,815 B2
(45) Date of Patent: Jul. 30, 2024

(54) SEALING APPARATUS FOR BATTERY CELL

(71) Applicants: SK On Co., Ltd., Seoul (KR); Hana Technology Co., Ltd., Gyeonggi-do (KR)

(72) Inventors: Ji Eun Ahn, Daejeon (KR); Sang Jun Park, Daejeon (KR); Young Rae Oh, Daejeon (KR); Kang San Kim, Daejeon (KR); Jae Min Ryu, Daejeon (KR); Ho Jeong Lee, Gyeonggi-do (KR); Jeong Seok Jeong, Gyeonggi-do (KR)

(73) Assignees: SK ON CO., LTD., Seoul (KR); HANA TECHNOLOGY CO., LTD., Gyeonggi-Do (KR)

( * ) Notice: Subject to any disclaimer, the term of this patent is extended or adjusted under 35 U.S.C. 154(b) by 13 days.

(21) Appl. No.: 18/295,492

(22) Filed: Apr. 4, 2023

(65) Prior Publication Data

US 2023/0327246 A1    Oct. 12, 2023

(30) Foreign Application Priority Data

Apr. 5, 2022 (KR) .................. 10-2022-0042427

(51) Int. Cl.
| | |
|---|---|
| H01M 50/183 | (2021.01) |
| H01M 10/04 | (2006.01) |
| H01M 10/615 | (2014.01) |
| H01M 50/204 | (2021.01) |

(52) U.S. Cl.
CPC ..... *H01M 50/183* (2021.01); *H01M 10/0404* (2013.01); *H01M 10/615* (2015.04); *H01M 50/204* (2021.01)

(58) Field of Classification Search
CPC ............ H01M 50/183; H01M 50/204; H01M 10/0404
See application file for complete search history.

(56) References Cited

FOREIGN PATENT DOCUMENTS

| KR | 10-2013-0095123 A | 8/2013 |
|---|---|---|
| KR | 102042775 B1 * | 11/2019 |
| WO | WO-2021194293 A1 * | 9/2021 |

OTHER PUBLICATIONS

EPO machine generated English translation of WO-2021194293-A1 (Year: 2021).*
EPO machine generated English translation of KR-102042775-B1 (Year: 2019).*

* cited by examiner

*Primary Examiner* — Christopher P Domone
*Assistant Examiner* — Kimberly Wyluda
(74) *Attorney, Agent, or Firm* — IP & T GROUP LLP

(57) ABSTRACT

A sealing apparatus is disclosed. In some implementations, the sealing apparatus includes a process chamber having an internal space, a cell loading portion configured to load a plurality of battery cells and enter the internal space of the process chamber, a plurality of sealing units disposed in the internal space of the process chamber, the plurality of sealing units configured to partially seal the battery cells, respectively, and a driving portion configured to move the plurality of sealing units such that the plurality of sealing units come into contact with the plurality of battery cells, respectively.

8 Claims, 9 Drawing Sheets

SEALING APPARATUS FOR BATTERY CELL

CROSS-REFERENCE TO RELATED APPLICATION (S)

This patent document claims the priority and benefits of Korean Patent Application No. 10-2022-0042427 filed on Apr. 5, 2022, the disclosure of which is incorporated herein by reference in its entirety.

TECHNICAL FIELD

The technology and implementations disclosed in this patent document generally relate to a sealing apparatus for a battery cell.

BACKGROUND

Unlike primary batteries, secondary batteries may be charged and discharged, and thus are applicable to devices within various fields such as digital cameras, mobile phones, notebook computers, hybrid vehicles, and electric vehicles. Among secondary batteries, a large amount of research has recently been conducted into lithium secondary batteries having high energy density and discharge voltage.

In general, lithium secondary batteries have been manufactured as pouch-type battery cells having flexibility, prismatic battery cells having rigidity, or cylindrical can-type battery cells.

A process of manufacturing a double pouch-type battery cell is schematically described as follows: first, an electrode assembly to which an electrode lead is bonded is disposed in an accommodation space of a case. The casing is partially sealed to form a pouch-type casing with one open side. Thereafter, an electrolyte is injected into the case through the one open side. When the injection of the electrolyte is completed, a process of sealing the one open side is performed sequentially.

Accordingly, there is a need for a sealing apparatus capable of stably sealing the one side of the case into which the electrolyte is injected.

RELATED ART DOCUMENT

Patent Document

Patent Document: KR Patent Application Publication No. 10-2013-0095123

SUMMARY

The disclosed technology can be implemented in some embodiments to provide a sealing apparatus for a battery cell capable of stably sealing one side of a case into which an electrolyte is injected.

In some embodiments of the disclosed technology, a sealing apparatus may include a process chamber having an internal space, a cell loading portion configured to load a plurality of battery cells and enter the internal space of the process chamber, a plurality of sealing units disposed in the internal space of the process chamber, the plurality of sealing units configured to partially seal the battery cells, respectively, and a driving portion configured to move the plurality of sealing units such that the plurality of sealing units come into contact with the plurality of battery cells, respectively.

The cell loading portion may include a base on which the plurality of battery cells are seated, and a fixing portion coupled to the base, the fixing portion configured to support each of the plurality of battery cells such that the plurality of battery cells are spaced apart from each other.

The cell loading portion may further include a cover portion coupled to the base. The cover portion may be configured to cover an entrance of the process chamber, when the cell loading portion enters the internal space of the process chamber, to form the internal space of the process chamber as a closed space.

The cell loading portion may be configured to linearly move in a first direction and enter the internal space of the process chamber. The sealing unit may be configured to linearly move in a second direction, orthogonal to the first direction, and to come into contact with the plurality of battery cells.

The plurality of sealing units may be disposed in pairs. A pair of sealing units may be disposed on opposite sides of one battery cell to seal the one battery cell.

Each of the sealing units may be coupled to a rail disposed on a ceiling surface of the internal space of the process chamber, and may be configured to linearly move along the rail.

Each of the sealing units may include a fixed frame coupled to the rail, a heater portion coupled to the fixed frame, and a heat transfer portion coupled to a side surface of the heater portion to transfer heat generated by the heater portion to the battery cell. The pair of sealing units may be disposed such that heat transfer portions oppose each other.

The sealing apparatus may further include a guide member disposed in the internal space of the process chamber and connected to the driving portion to reciprocally move in a third direction, a vertical direction. The pair of sealing units may be coupled to the guide member to linearly move in the second direction according to movement of the guide member.

The third direction may be a direction, orthogonal to the first direction and the second direction.

Two guide holes may be provided in the guide member, and the two guide holes may be formed such that a distance therebetween increases upwardly and the distance therebetween decreases downwardly. The pair of sealing units may be coupled to the two guide holes, respectively, and may be configured to move to correspond to a shape of the guide hole.

Each of the sealing units may include a fixed frame coupled to a ceiling surface of the internal space of the process chamber to be linearly movable, a heater portion coupled to the fixed frame, and a heat transfer portion coupled to a side surface of the heater portion to transfer heat generated by the heater portion to the battery cell. Insertion protrusions, inserted into the guide holes, may be formed at opposite ends of the fixed frame.

In a sealing apparatus according to some embodiments of the disclosed technology, a cell loading portion may enter an internal space of a process chamber in a first direction, parallel to the ground, thereby lowering an overall height of the sealing apparatus as compared to a case in which the cell loading portion enters the process chamber in a direction, perpendicular to the ground. In addition, an operator may more easily access the cell loading portion, thereby providing high convenience in terms of operation or maintenance.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
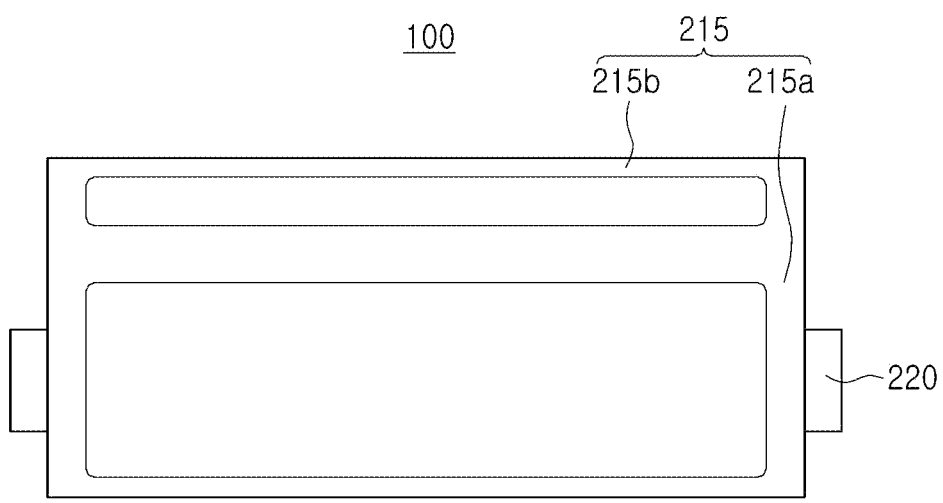
FIG. 1 is a plan view of a battery cell according to some embodiments of the disclosed technology.

Features of the disclosed technology disclosed in this patent document are described by embodiments with reference to the accompanying drawings.

Before describing embodiments of the disclosed technology, the words and terminologies used in the specification and claims should not be construed with common or dictionary meanings, but construed as meanings and conception coinciding the spirit of the disclosed technology under a principle that the inventor (s) can appropriately define the conception of the terminologies to explain the disclosed technology in the optimum method. Therefore, embodiments described in the specification and the configurations illustrated in the drawings are not more than the most preferred embodiments of the disclosed technology and do not fully cover the spirit of the disclosed technology. Accordingly, it should be understood that there may be various equivalents and modifications that can replace those when the present application is filed.

Hereinafter, preferred embodiments of the disclosed technology will be described in detail with reference to the accompanying drawings. In this case, it should be noted that the same components are denoted by the same reference numerals in the accompanying drawings. In addition, detailed descriptions of well-known functions and configurations that may obscure the gist of the disclosed technology will be omitted. In addition, some components are exaggerated, omitted, or schematically illustrated in the accompanying drawings, and the size of each component does not fully reflect the actual size.

In addition, in embodiments of the disclosed technology, an upper side, an upper portion, a lower side, a lower portion, a side surface, and the like are described with reference to the drawings, and may be described differently when a direction of a corresponding object is changed.

The disclosed technology can be implemented in some embodiments to provide a sealing apparatus for a battery cell.

Figure 2:
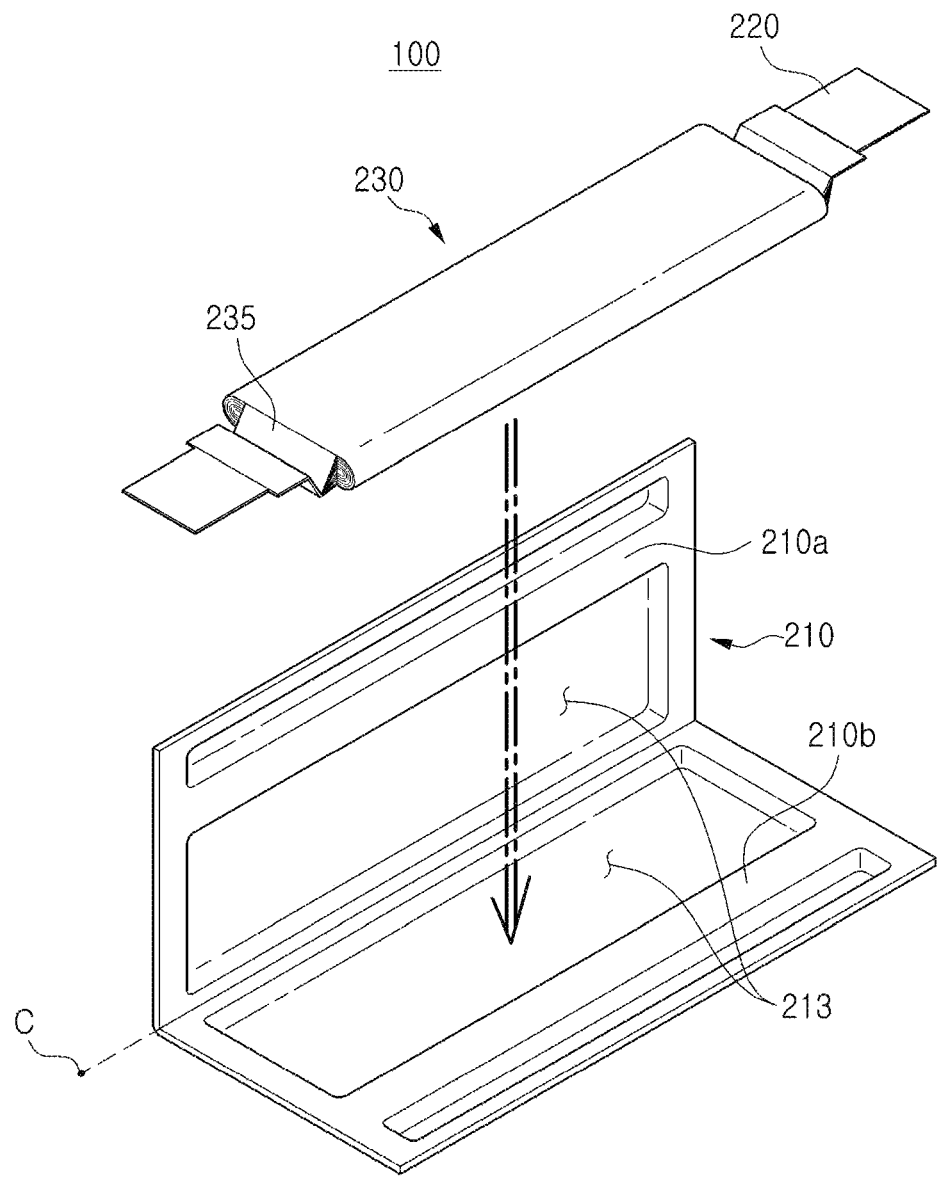
FIG. 2 is an exploded perspective view of the battery cell illustrated in FIG. 1.

FIG. 1 is a plan view of a battery cell according to some embodiments of the disclosed technology, and FIG. 2 is an exploded perspective view of the battery cell illustrated in FIG. 1.

Referring to FIGS. 1 and 2, a battery cell 100 manufactured through a case opening apparatus according to the present embodiment may include an electrode assembly 230 and a case 210 accommodating the electrode assembly 230.

The battery cell 100 according to the present embodiment, a battery capable of being charged and discharged, may include a lithium ion (Li-ion) battery or a nickel metal hydride (Ni-MH) battery. The nickel metal hydride battery may be a battery cell using nickel for a positive electrode, using a hydrogen-absorbing alloy for a negative electrode, and using an alkaline aqueous solution as an electrolyte, and may have a high capacitance per unit volume, such that the nickel metal hydride battery may be used within various fields, such as not only being used as an energy source for an electric vehicle (EV), a hybrid vehicle (HEV), or the like, but also being used for energy storage.

The electrode assembly 230, a member in which a plurality of electrodes are stacked, may be formed to have a substantially hexahedral shape, and may be accommodated in an accommodation space 213 of the case 210 together with an electrolyte.

The case 210 may be formed of a flexible film material. For example, the case may be formed of a material obtained by insulating a surface of a metal thin film formed of aluminum.

The accommodation space 213 in which the electrode assembly 230 is accommodated may be provided in the case 210. In addition, an electrode lead 220 may be disposed to protrude to the outside of the case 210.

As illustrated in FIG. 2, the battery cell 100 according to the present embodiment may seal the accommodation space 213 by folding a sheet of exterior material and then bonding three side surfaces thereof. Accordingly, the case 210 according to the present embodiment may be divided into a first case 210a and a second case 210b with respect to a bending line C along which the exterior material is folded.

Specifically, the battery cell 100 according to the present embodiment may be manufactured by accommodating the electrode assembly 230 in the accommodation space 213, folding the exterior material along the bending line C, and then bonding, to each other, edges at which the first case 210a and the second case 210b are in contact with each other to seal the accommodation space 213.

As a method of bonding the edges to each other, a thermal fusion method may be used, but the disclosed technology is not limited thereto. Hereinafter, a bonded edge portion is referred to as a sealing portion 215.

In the present embodiment, the sealing portion 215 may be divided into a first sealing portion 215a formed in a portion in which the electrode lead 220 is disposed, and a second sealing portion 215b formed in a portion in which the electrode lead 220 is not disposed.

In the battery cell 100 according to the present embodiment, the first case 210a and the second case 210b may each have the accommodation space 213. However, the disclosed technology is not limited thereto, and various modifications may be made, such as the accommodation space 213 provided in only one of the first case 210a and the second case 210b, and the like.

In addition, an electrode tab 235 may be disposed between the electrode assembly 230 and the sealing portion 215. The electrode tab 235 may electrically connect the electrode assembly 230 and the electrode lead 220 to each other, and a plurality of electrode tabs 235 may extend from the electrode assembly 230 to be bonded to at least one electrode lead 220.

The electrode lead 220 may include a positive electrode lead and a negative electrode lead. At least a portion of the electrode lead 220 may protrude to the exterior of the case 210, and the electrode assembly 230 may be electrically connected to external elements through the electrode lead 220.

The battery cell 100 configured as described above may be manufactured by form an accommodation space 213 in the case 210 through press processing, and the like, accommodating the assembly in electrode 230 the accommodation space 213, and then sealing the accommodation space 213. More specifically, a process of forming the first sealing portion 215*a* by accommodating the electrode assembly 230 in the accommodation space 213 of the case 210, and then sealing a portion in which the electrode lead 220 is disposed may be performed first. In addition, a process of forming the second sealing portion 215*b* by injecting an electrolyte into the accommodation space 213 through a portion in which the second sealing portion 215*b* is to be formed and then sealing the portion may be sequentially performed.

The sealing apparatus according to the present embodiment to be described below may be an apparatus used in the process of forming the second sealing portion 215*b*, among the above processes.

Figure 3:
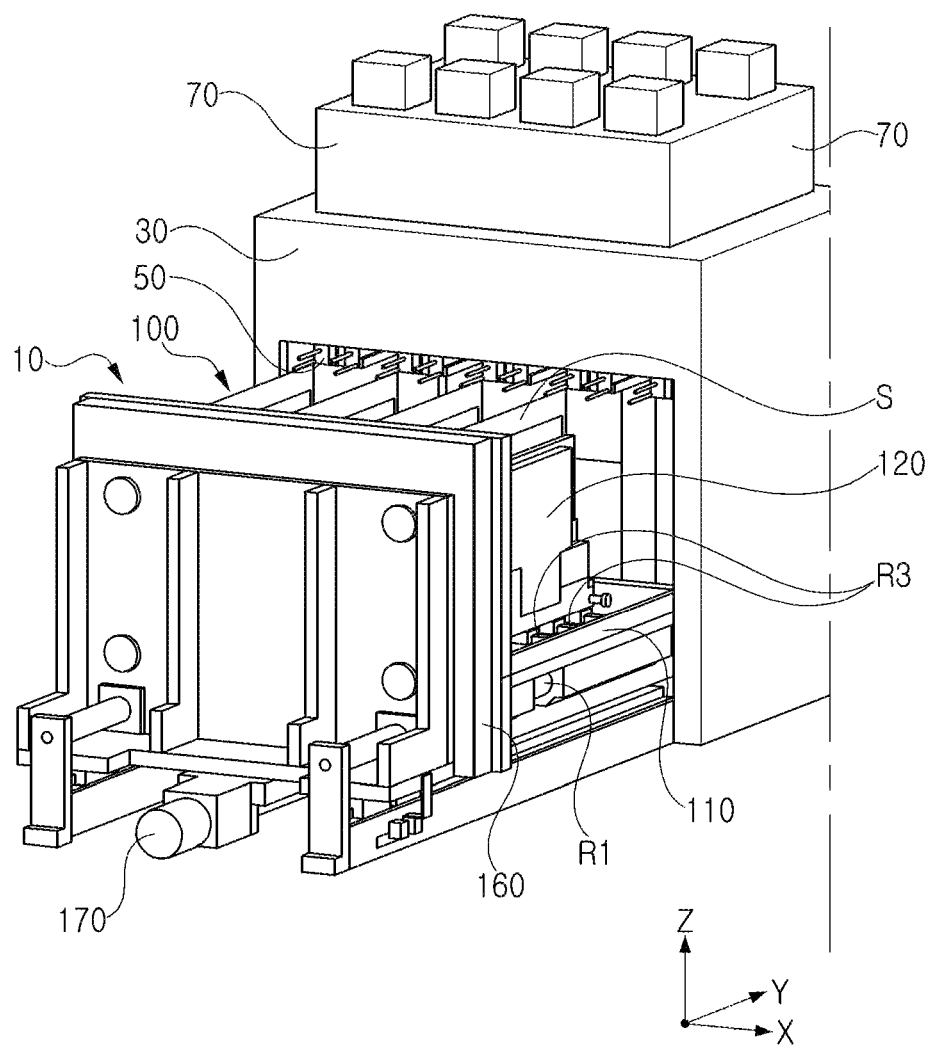
FIG. 3 is a schematic perspective view of a sealing apparatus for a battery cell according to some embodiments of the disclosed technology.
Figure 4:
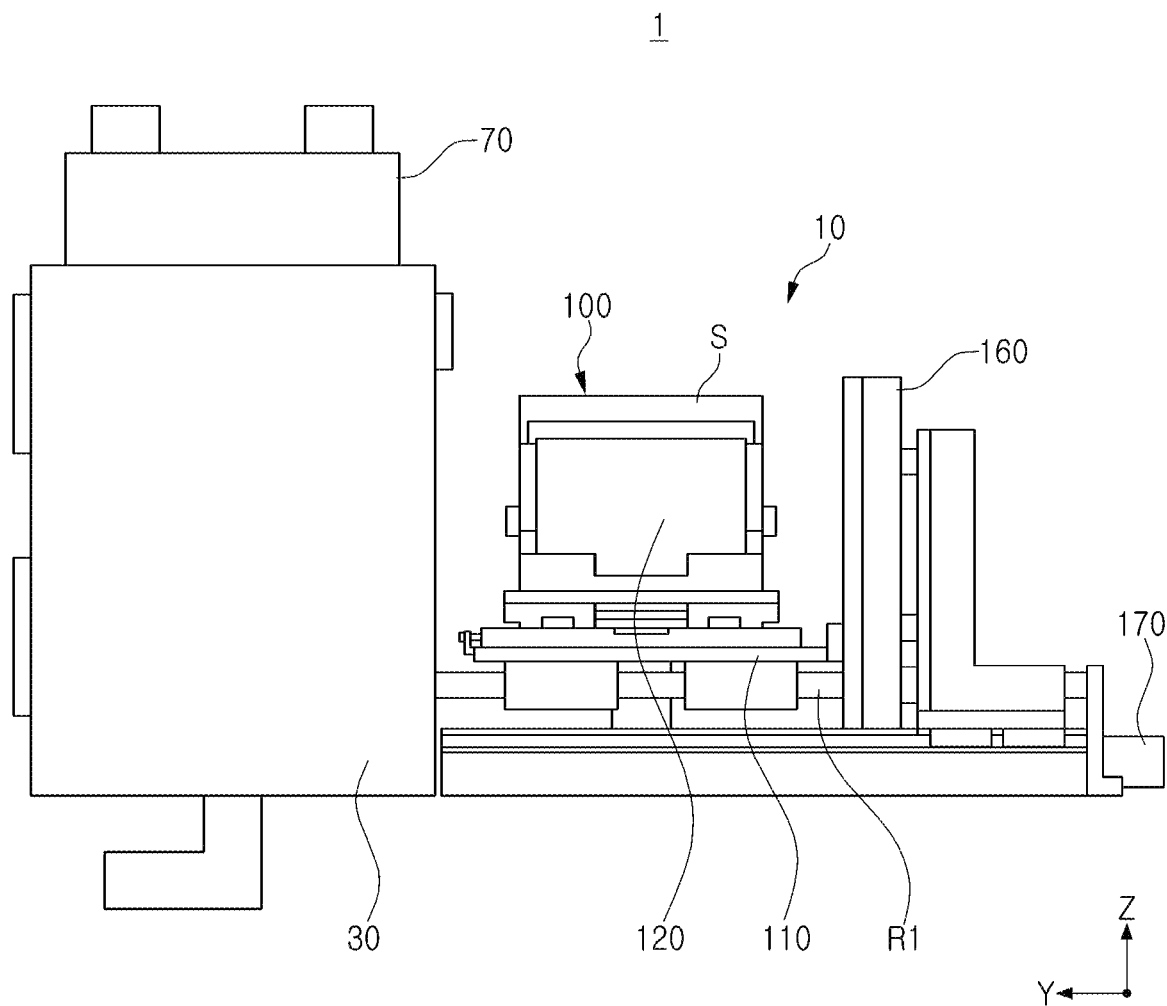
FIG. 4 is a side view of the sealing apparatus illustrated in FIG. 3.
Figure 5:
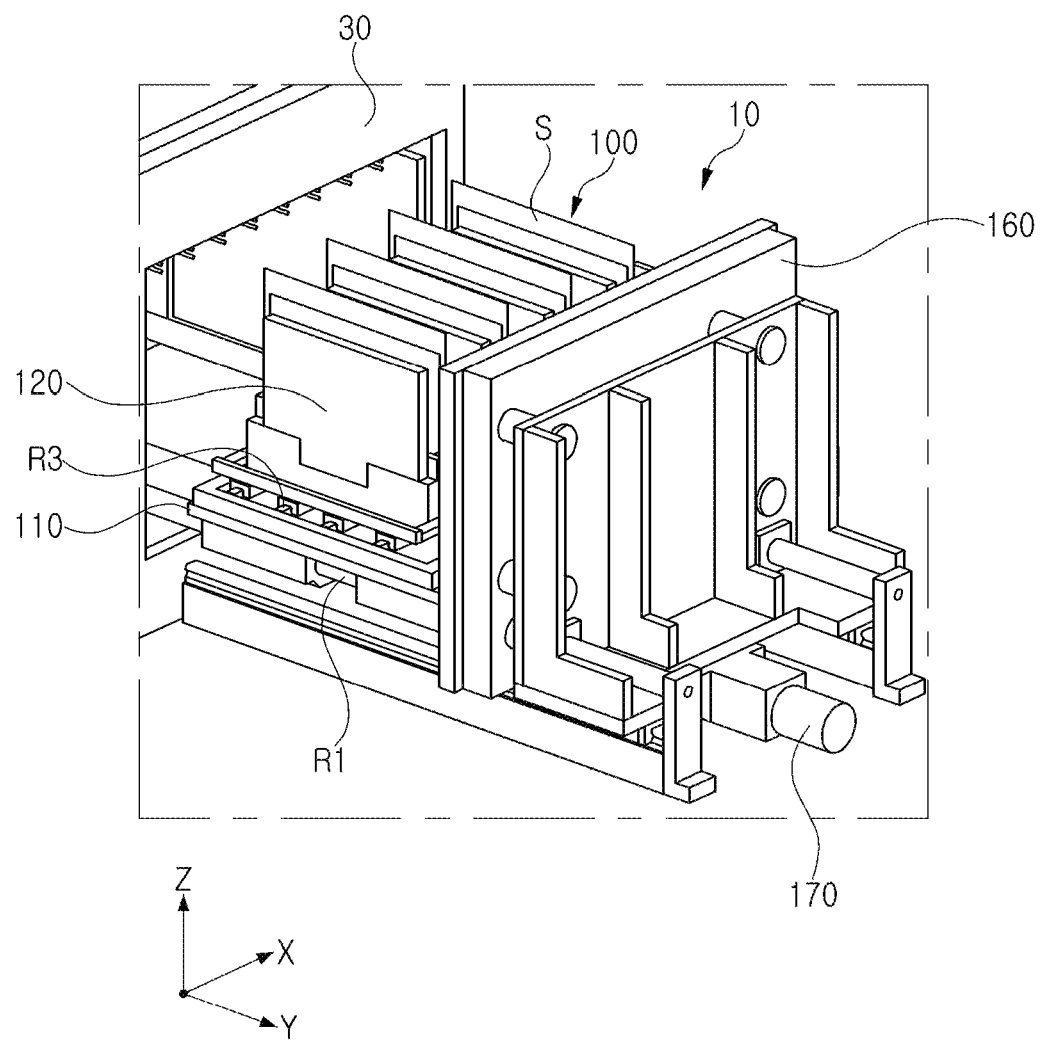
FIG. 5 is a partial perspective view of the sealing apparatus illustrated in FIG. 3 from another direction.
Figure 6:
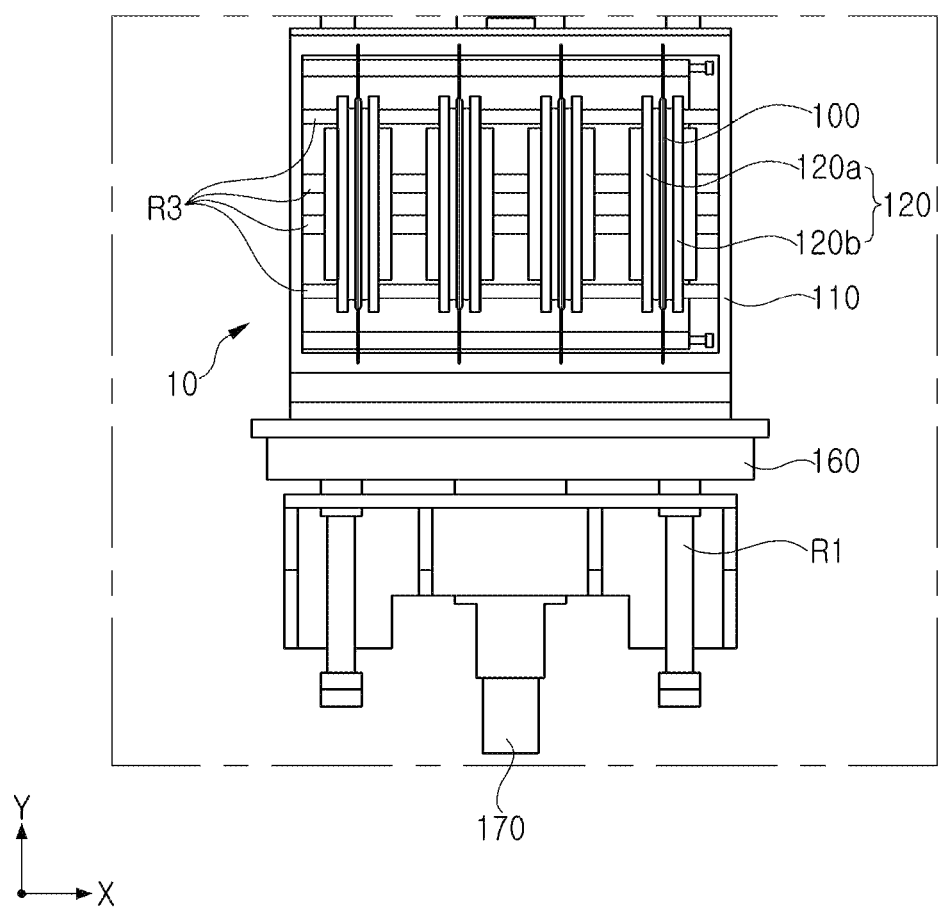
FIG. 6 is a plan view of FIG. 5.

FIG. 3 is a schematic perspective view of a sealing apparatus for a battery cell according to some embodiments of the disclosed technology. FIG. 4 is a side view of the sealing apparatus illustrated in FIG. 3. FIG. 5 is a partial perspective view of the sealing apparatus illustrated in FIG. 3 from another direction. FIG. 6 is a plan view of FIG. 5.

Referring to FIGS. 3 to 6 together, a sealing apparatus for a battery cell 1 according to the present embodiment may include a cell loading portion 10, a process chamber 30, a sealing unit 50, and a driving portion 70. The cell loading portion 10 may accommodate a plurality of battery cells, and may be inserted into or withdrawn from an internal space of the process chamber 30. To this end, the cell loading portion may include a base 110, a fixing portion 120, and a cover portion 160.

The base 110 may be a lower structure supporting other elements of the cell loading portion 10, and the fixing portion 120 and the cover portion 160 may be disposed on an upper surface of the base 110.

The base 110 may be configured to be slidably movable. For example, a first rail R1 may be disposed below the base 110, and the base 110 may be coupled to the first rail R1 to move along the first rail R1.

In the present embodiment, the base 110 may be disposed to be reciprocally movable in a first direction (Y-axis direction). For example, the first direction may be a direction, parallel to the ground.

The cell loading portion 10 may be accommodated in the internal space of the process chamber 30 to be described below. Accordingly, the base 110 may be configured to reciprocally move between the inside and outside of the process chamber 30 along the first rail R1.

The battery cell 100, seated on the base 110, may be fixed by the fixing portion 120. As illustrated in FIG. 6, the fixing portion 120 according to the present embodiment may include a first fixing portion 120*a* and a second fixing portion 120*b* respectively disposed on opposite sides of the battery cell 100. The first fixing portion 120*a* and the second fixing portion 120*b* may be coupled to the base 110 so as to be movable in a direction closer to or farther away from the battery cell 100. To this end, the base 110 may have at least one third rail R3 to which the first fixing portion 120*a* and the second fixing portion 120*b* are coupled.

The third rail R3 may be disposed in a second direction (X-axis direction), and a plurality of third rails R3 may be disposed in parallel. Here, the second direction may be a direction, different from the first direction. For example, the second direction may be a direction, parallel to the ground and orthogonal to the first direction.

Accordingly, the first fixing portion 120*a* and the second fixing portion 120*b* may move along the third rail R3 in the direction of pressurizing the battery cell 100, and may be fixed to the base 110 in close contact with the battery cell 100 to fix the battery cell 100.

The first fixing portion 120*a* and the second fixing portion 120*b* may be disposed to be in contact with wide opposite surfaces of the battery cell 100, respectively, such that the movement of the battery cell 100 may be restrained, and the battery cell 100 may be fixed to the base 110 in a state in which a portion S (hereinafter referred to as a sealing region), formed later as the second sealing portion (215*b* in FIG. 1), faces upwardly.

A plurality of battery cells 100 may be seated on the base 110, such that a plurality of fixing portions 120 may be provided to fix the battery cells 100, respectively. In this case, a plurality of first fixing portions 120*a* may be coupled to the third rail R3 so as to collectively move. Similarly, a plurality of second fixing portions 120*b* may be coupled to the third rail R3 so as to collectively move. In this case, the third rail R3 to which the first fixing portion 120*a* is coupled and the third rail R3 to which the second fixing portion 120*b* is coupled may be different from each other.

The entire sealing region S of the battery cell 100, fixed to the fixing portion 120, may be exposed to the outside of the fixing portion 120. Accordingly, the fixing portion 120 may be in contact with a portion of a surface of the battery cell 100 other than the sealing region S to fix the battery cell 100.

The cover portion 160 may be formed on one side of the cell loading portion 10. When the cell loading portion 10 enters the process chamber 30 to be described below, the cover portion 160 may cover an opening (or entrance) of the process chamber 30. Accordingly, the cover portion 160 may be used as a door for closing the entrance of the process chamber 30.

To this end, the cover portion 160 may be formed to have a size and shape corresponding to those of the opening of the process chamber 30, and may be configured to entirely cover the entrance of the process chamber 30 when the cell loading portion 10 is entirely accommodated in the process chamber 30. Accordingly, when the cell loading portion 10 is completely accommodated in the process chamber 30, the internal space of the process chamber 30 may be formed as a closed space by the cover portion 160.

The cell loading portion 10 configured as described above may move along the first rail R1 through a driving means 170. As long as the driving means 170 allows the cell loading portion 10 to reciprocally move, various means may be used. In the present embodiment, a motor may be used as the driving means 170. For example, a shaft may be rotated using a motor, and the base 110 may be screwed to the shaft to move in a longitudinal direction of the shaft according to rotation of the motor. The disclosed technology is not limited thereto, and various modifications may be made, such as a linear motor or a pneumatic cylinder used as the driving means 170.

The process chamber 30 may have a space accommodating the cell loading portion 10 to which the battery cell 100 is fixed. In the present embodiment, the process chamber 30 may have a hexahedral-shaped internal space with one open surface. In addition, the cell loading portion 10 may enter the internal space of the process chamber 30 through the one open surface, that is, the opening of the process chamber 30.

A process of sealing the battery cell 100 may be performed in the internal space of the process chamber 30. Accordingly, in order to increase a degree of vacuum in the internal space of the process chamber 30 in the process of sealing the battery cell 100, the internal space of the process chamber 30 may be connected to a vacuum apparatus.

In addition, the sealing unit 50, sealing the battery cell 100, may be disposed in the internal space of the process chamber 30.

Figure 7:
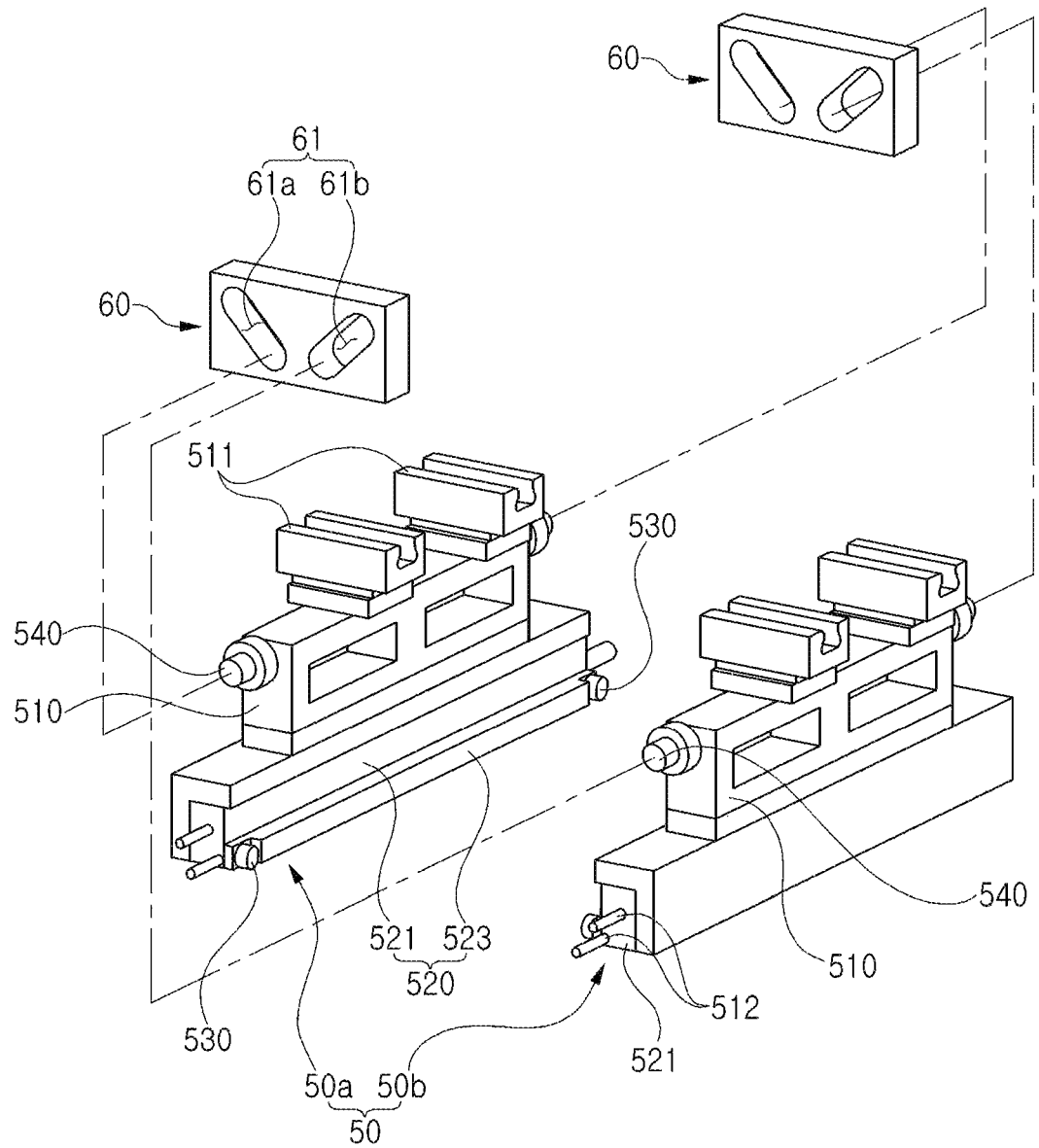
FIG. 7 is an exploded perspective view of a sealing unit and a guide member according to some embodiments of the disclosed technology.
Figure 8:
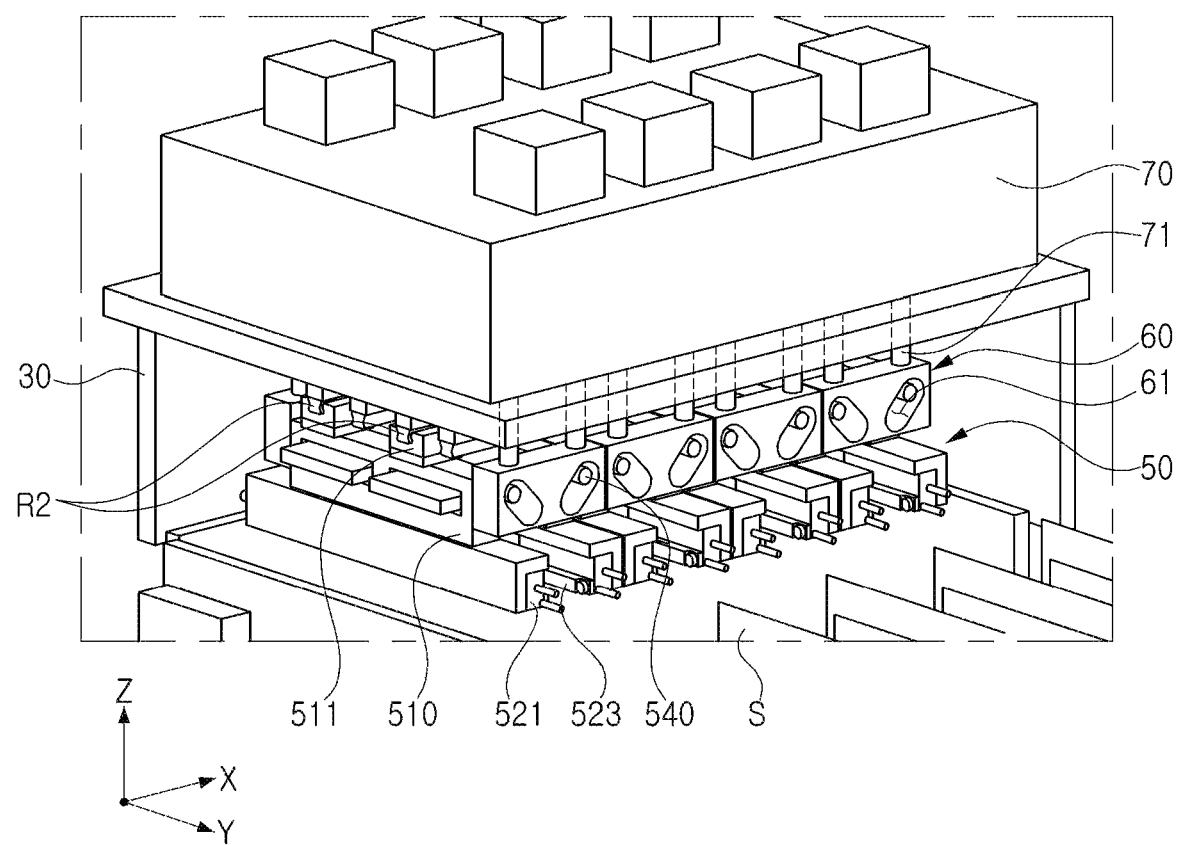
FIGS. 8 and 9 are partial perspective views illustrating an operation of a sealing unit and a guide member.
Figure 9:
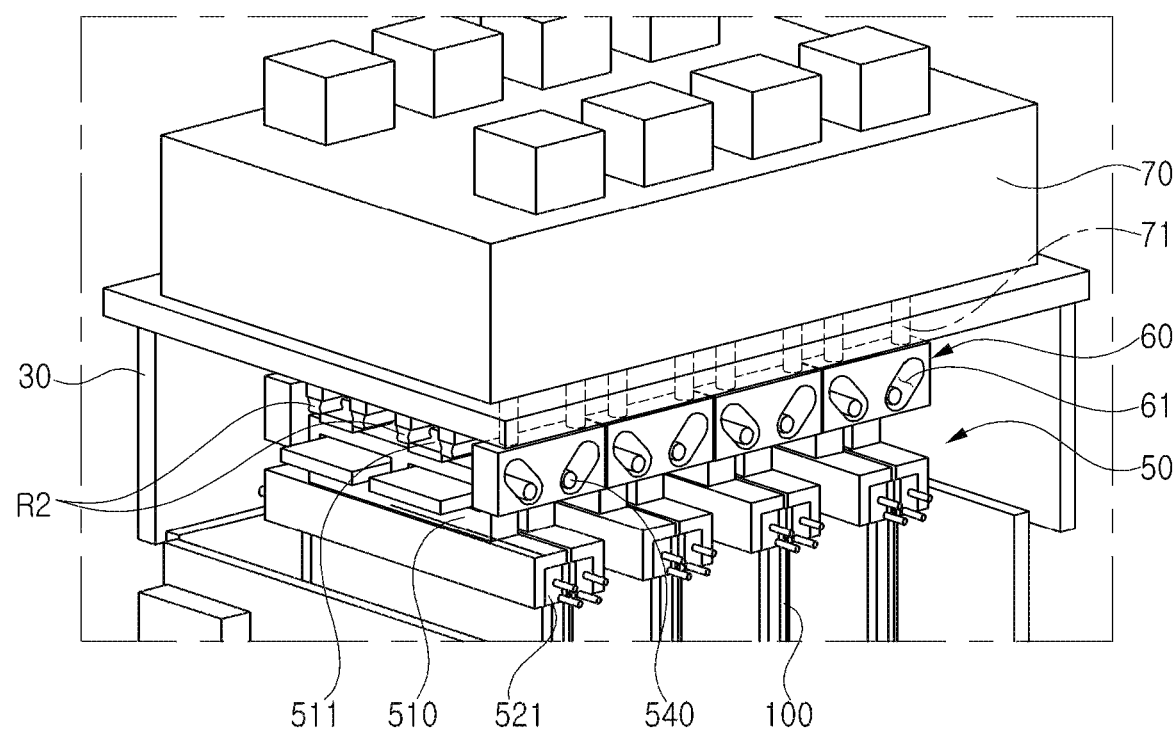

FIG. 7 is an exploded perspective view of a sealing unit and a guide member according to some embodiments of the disclosed technology. FIGS. 8 and 9 are partial perspective views illustrating an operation of a sealing unit and a guide member. Here, FIGS. 8 and 9 illustrate the sealing unit and guide member with the process chamber partially removed for ease of description.

Referring to FIGS. 7 to 9 together, the sealing unit 50 may be coupled to an upper surface of an internal space of the process chamber 30. More specifically, a second rail R2 may be provided on a ceiling surface of the internal space of the process chamber 30, and the sealing unit 50 may be coupled to the second rail R2 to be slidably movable along the second rail R2.

The second rail R2 may be disposed in a second direction (X-direction). As described above, in the present embodiment, the third rail R3 may be also disposed in the second direction. Accordingly, the second rail R2 and the third rail R3 may be disposed to be parallel to each other.

Accordingly, when the battery cell 100 is input into the internal space of the process chamber 30, the sealing unit 50 may move to be closer to or farther away from the battery cell 100 in the second direction.

A plurality of second rails R2 may be disposed in parallel such that the sealing unit 50 is stably coupled to the ceiling surface of the process chamber 30. However, the disclosed technology is not limited thereto.

The sealing unit 50 may be disposed in the internal space of the process chamber 30 to bond the sealing region S of the battery cell 100 fixed to the fixing portion 120 in a thermal fusion manner. To this end, the sealing unit 50 may include a fixed frame 510, a fusion portion 520, a spacing member 530, and an insertion protrusion 540.

The fixed frame 510 may be coupled to the second rail R2 to be slidably movable. For more stable coupling and movement, the fixed frame 510 may be coupled to two second rails R2. To this end, the fixed frame 510 may include two rail coupling portions 511 respectively coupled to the two second rails R2.

A fusion portion 520, thermally fusing the battery cells 100, may be disposed on a lower surface of the fixed frame 510. The fusion portion 520 may include a heater portion 521 and a heat transfer portion 523.

The heater portion 521 may be provided in the form of a long block, and may include a heating element therein. Accordingly, the heater portion 521 may supply heat generated from the heating element to the heat transfer portion 523.

A length of the heater portion 521 may be formed to be longer than a length of the sealing region S of the battery cell 100.

In order to minimize transfer of heat generated from the heater portion 521 to the fixed frame 510, a heat insulating member may be disposed between the heater portion 521 and the fixed frame 510. In addition, in order to determine a temperature of the heater portion 521 in a sealing process, at least one temperature sensor 512 may be provided in the heater portion 521.

The heat transfer portion 523 may be coupled to a side surface of the heater portion 521 to transfer heat supplied from the heater portion 521 to the sealing region S of the battery cell 100. Accordingly, the heat transfer portion 523 may be formed of a material having high thermal conductivity. The sealing region S of the battery cell 100 may be thermally fused by heat transmitted from the heat transfer portion 523, and thus the second sealing unit 215b may be formed.

In the sealing process, the heat transfer portion 523 may repeatedly come into contact with the battery cell 100, and thus may be worn or damaged during long-term use. Accordingly, the heat transfer portion 523 may be periodically replaced.

In a case in which the heat transfer portion 523 is formed integrally with the heater portion, both the heat transfer portion 523 and the heater portion 521 may need to be replaced when the heat transfer portion 523 is replaced. Thus, costs required for replacement may increase. Accordingly, in order to minimize the costs, the sealing unit 50 according to the present embodiment may be coupled to the heater portion 521 such that the heat transfer portion 523 is detachable.

The sealing units 50 according to the present embodiment configured as described above may be disposed in pairs. A pair of sealing units 50 may be disposed such that the heat transfer portions 523 oppose each other. In addition, the pair of sealing units 50 may move in a direction closer to each other along the second rail R2 to pressurize the sealing region S of the battery cell 100 disposed between the pair of sealing units 50 from opposite sides thereof.

Accordingly, the pair of sealing units 50 may be disposed to be symmetrical to each other with respect to the battery cell 100 disposed therebetween.

In addition, the sealing unit 50 may include at least one spacing member 530.

The spacing member 530 may be formed to protrude in a direction in which the heat transfer portion 523 is disposed. In addition, the heat transfer portion 523 may further protrude outward than a contact surface in contact with the battery cell 100.

Accordingly, in a process of sealing the sealing region S, in the pair of sealing units 50, only the spacing members 530 may be in contact with each other and the heat transfer elements 523 may not be in contact with each other. That is, when the pair of sealing units 50 are in close contact with each other, the heat transfer portions 523 may be spaced apart from each other by a predetermined distance by the spacing members 530. The sealing region S of the battery cell 100 may be disposed in a gap formed between the heat transfer portions 523. Accordingly, the gap between the heat transfer portions 523 may be adjusted according to the standard of the battery cell 100, the thickness of an exterior material, or the like, and such adjustment may be implemented by adjusting a protruding distance of the spacing member 530.

In the present embodiment, the spacing member 530 may be formed in the form of a bolt or the like to be coupled to the heat transfer portion 523, but the disclosed technology is not limited thereto. The spacing member 530 may be disposed on the heater portion 521 or fixed to the frame 510, as necessary.

Insertion protrusions 540 may be provided at opposite ends of the fixed frame 510 in a longitudinal direction, respectively. The insertion protrusion 540 may protrude to extend a length of the fixed frame 510, and may be inserted into the guide hole 61 of the guide member 60 to be described below.

The insertion protrusion 540 may move within the guide hole 61 according to the movement of the guide member 60.

Accordingly, the insertion protrusion 540 may have a bearing to minimize interference with the guide member 60. For example, the insertion protrusion 540 may be configured in the form of a cam follower.

The sealing unit 50 according to the present embodiment configured as described above may be coupled to a ceiling surface of the process chamber 30 so as to linearly move in the second direction. In addition, according to the movement of the guide member 60, two sealing units 50 forming a pair may move in a direction closer to each other or farther away from each other.

The guide member 60 may be disposed in the internal space of the process chamber 30, and may have a guide hole 61 into which the insertion protrusion 540 of the sealing unit 50 is inserted. As described above, the insertion protrusions 540 may be provided at opposite ends of the fixed frame 510, respectively. Accordingly, with respect to one sealing unit 50, two guide members 60 may be disposed to be coupled to the opposite ends of the fixed frame 510, respectively.

In addition, the above-described pair of sealing units 50 may be coupled to one guide member 60. Accordingly, in the sealing apparatus 1 according to the present embodiment, a pair of guide members 60 may be coupled to the pair of sealing units 50.

Hereinafter, the pair of sealing units 50, divided into a first sealing unit 50a and a second sealing unit 50b, will be described.

Both an insertion protrusion 540 of the first sealing unit 50a and an insertion protrusion 540 of the second sealing unit 50b may be inserted into the guide hole 61. To this end, the guide hole 61 may include a first guide hole 61a into which the insertion protrusion 540 of the first sealing unit 50a is inserted, and a second guide hole 61b into which the insertion protrusion 540 of the second sealing unit 50b is inserted.

The first guide hole 61a and the second guide hole 61b may be provided in the form of a through-hole, and may be spaced apart from each other by a predetermined distance, but the disclosed technology is not limited thereto. The first guide hole 61a and the second guide hole 61b may be provided in the form of one "V"-shaped hole, as necessary.

The first guide hole 61a and the second guide hole 61b may each be formed as an oblique hole, and may be formed such that a distance therebetween increases upwardly and the distance therebetween decreases downwardly. Accordingly, the pair of sealing units 50a and 50b, coupled to the guide member 60, may linearly move in the second direction to correspond to vertical movement of the guide member 60.

For example, the pair of sealing units 50a and 50b may linearly move in a direction farther away from each other when the guide member 60 rises, and the pair of sealing units 50a and 50b may linearly move in a direction closer to each other when the guide member 60 falls.

The driving portion 70 may be connected to the guide member 60 to reciprocally move the guide member 60 in a third direction (Z-direction). Here, the third direction may be a direction, orthogonal to the first direction and the second direction. For example, the third direction may be a direction, perpendicular to the ground.

The driving portion 70 may be disposed outside the process chamber 30 and may include a connection member 71 passing through the process chamber 30 to be connected to the guide member 60. The connecting member 71 may be provided in the form of a shaft, and may reciprocally move in a longitudinal direction according to driving of the driving portion 70. Accordingly, the guide member 60 fastened to an end of the connection member 71 may linearly move in the third direction to correspond to the movement of the connection member 71.

As long as the driving portion 70 is capable of reciprocally moving the guide member 60, the driving portion 70 may be provided in various forms and may be disposed in various positions. For example, the driving portion 70 may include a pneumatic hydraulic cylinder or a linear motor.

The driving portion 70 may be configured to simultaneously move the pair of guide members 60 described above. In addition, a plurality of driving portions 70 may be provided to independently move several pairs of guide members 60.

Subsequently, an operation of the sealing apparatus 1 described above will be generally described.

First, as illustrated in FIG. 5, a plurality of battery cells 100 may be seated on the cell loading portion 10. In this case, the battery cells 100 may be disposed such that the sealing region S faces upwardly, and the battery cells 100 may be spaced apart from each other by a predetermined distance and may be fixed by the fixing portion 120.

Subsequently, the cell loading portion 10 may be inserted into the internal space of the process chamber 30. In the present operation, the guide member 60 may be maintained in a state of being lowered by the driving portion 70, as illustrated in FIG. 8. As a result, the pair of sealing units 50 may be maintained in a state of being spaced as far apart as possible. Accordingly, when the cell loading portion 10 is inserted into the process chamber 30, the sealing region S of the battery cells 100, seated on the cell loading portion 10, may be disposed between the pair of sealing units 50.

When the cell loading portion 10 is entirely inserted into the process chamber 30, a cover portion provided in the cell loading portion 10 may close an opening of the process chamber 30, and accordingly the internal space of the process chamber 30 may be formed as a closed space.

Subsequently, a process of increasing a degree of vacuum in the internal space of the process chamber 30 may be performed using a vacuum apparatus. In this process, unnecessary gas present in the battery cell 100 may be discharged to the outside of the process chamber 30.

Subsequently, the driving portion 70 may raise the guide member 60. Accordingly, as illustrated in FIG. 9, the pair of sealing units 50 may move in a direction closer to each other according to a shape of the guide hole 61 to come into contact with the sealing region S of the battery cell 100 disposed therebetween.

In this case, the heat transfer portion 523 may come into contact with the battery cell 100, and the pair of heat transfer portions 523 may apply heat transferred from the portion 521 to the sealing region S while heater simultaneously pressurizing the sealing region S at a predetermined pressure. Accordingly, the sealing region S may be thermally fused to form a second sealing portion (215b in FIG. 1).

When sealing of the sealing region S is completed, the driving portion 70 may lower the guide member 60 again, and accordingly the pair of sealing units 50 may move in a direction farther away from each other according to the shape of the guide hole 61. Accordingly, the sealing unit 50 may be separated from the battery cell 100.

Thereafter, the cell loading portion 10 may move to the outside of the process chamber 30 again, and the battery cells 100 may be separated from the cell loading portion 10 to be subject to a subsequent process.

In a sealing apparatus according to the present embodiment described above, a cell loading portion may enter an internal space of a process chamber in a first direction, parallel to the ground, such that an overall height of the sealing apparatus may be reduced as compared to a case in which the cell loading portion enters the process chamber in a direction, perpendicular to the ground. In addition, an operator may more easily access the cell loading portion, thereby providing high convenience in terms of operation or maintenance.

In addition, a plurality of battery cells may be simultaneously sealed, thereby minimizing the time required for manufacturing.

Only specific examples of implementations of certain embodiments are described. Variations, improvements and enhancements of the disclosed embodiments and other embodiments may be made based on the disclosure of this patent document.

What is claimed is:

1. A sealing apparatus comprising:
a process chamber having an internal space;
a cell loading portion configured to load a plurality of battery cells and enter the internal space of the process chamber;
a plurality of sealing units disposed in the internal space of the process chamber, the plurality of sealing units configured to partially seal the battery cells, respectively; and
a driving portion configured to move the plurality of sealing units such that the plurality of sealing units come into contact with the plurality of battery cells, respectively,
wherein the cell loading portion is configured to linearly move in the first direction and enters the internal space of the process chamber,
wherein the sealing unit is configured to move linearly in a second direction, orthogonal to the first direction, and to come into contact with the plurality of battery cells,
wherein the plurality of sealing units are disposed in pairs,
wherein a pair of sealing units are disposed on opposite sides of one battery cell to seal the one battery cell, and
wherein each of the sealing units is coupled to a rail disposed on a ceiling surface of the internal space of the process chamber, and is configured to move linearly along the rail.

2. The sealing apparatus of claim 1, wherein the cell loading portion includes:
a base on which the plurality of battery cells are seated; and
a fixing portion coupled to the base, the fixing portion configured to support each of the plurality of battery cells such that the plurality of battery cells are spaced apart from each other.

3. The sealing apparatus of claim 2, wherein
the cell loading portion further includes a cover portion coupled to the base, and
the cover portion is configured to cover an entrance of the process chamber, when the cell loading portion enters the internal space of the process chamber, to form the internal space of the process chamber as a closed space.

4. The sealing apparatus of claim 1, wherein
each of the sealing units includes a fixed frame coupled to the rail, a heater portion coupled to the fixed frame, and a heat transfer portion coupled to a side surface of the heater portion to transfer heat generated by the heater portion to the battery cell, and
the pair of sealing units are disposed such that heat transfer portions oppose each other.

5. The sealing apparatus of claim 1, further comprising:
a guide member disposed in the internal space of the process chamber and connected to the driving portion to reciprocally move in a third direction, which is perpendicular to the ground,
wherein the pair of sealing units are coupled to the guide member to move linearly in the second direction according to movement of the guide member.

6. The sealing apparatus of claim 5, wherein the third direction is a direction, orthogonal to the first direction and the second direction.

7. The sealing apparatus of claim 5, wherein
two guide holes are provided in the guide member, and the two guide holes are formed such that a distance therebetween increases upwardly and the distance therebetween decreases downwardly, and
the pair of sealing units are coupled to the two guide holes, respectively, and are configured to move to correspond to a shape of the guide hole.

8. The sealing apparatus of claim 7, wherein
each of the sealing units includes a fixed frame coupled to a ceiling surface of the internal space of the process chamber to be linearly movable, a heater portion coupled to the fixed frame, and a heat transfer portion coupled to a side surface of the heater portion to transfer heat generated by the heater portion to the battery cell, and
insertion protrusions, inserted into the guide holes, are formed at opposite ends of the fixed frame.

* * * * *